United States Patent [19]

Abbott

[11] Patent Number: 4,481,004
[45] Date of Patent: Nov. 6, 1984

[54] CONTINUOUSLY VARIABLE TRANSMISSION MECHANISM

[75] Inventor: Randle L. Abbott, Tamworth, England

[73] Assignee: P.I.V. Antrieb Werner Reimers Kommanditgesellschaft, Bad Homburg, Fed. Rep. of Germany

[21] Appl. No.: 142,389

[22] Filed: Apr. 21, 1980

Related U.S. Application Data

[63] Continuation of Ser. No. 9,324, Feb. 5, 1979, abandoned.

[30] Foreign Application Priority Data

Feb. 7, 1978 [GB] United Kingdom ............. 4776/78

[51] Int. Cl.³ .................................... F16H 55/52
[52] U.S. Cl. ................................ 474/28; 474/30
[58] Field of Search ................. 474/8, 28, 29, 30

[56] References Cited

U.S. PATENT DOCUMENTS

| | | | |
|---|---|---|---|
| 2,779,203 | 1/1957 | Eubanks | 474/28 |
| 3,081,642 | 3/1963 | Emerson | 474/28 |
| 3,600,961 | 8/1971 | Rattunde et al. | 474/28 |
| 3,670,594 | 6/1972 | Roper | 474/35 |
| 3,893,343 | 7/1975 | Zaiser et al. | 474/18 |
| 3,893,344 | 7/1975 | Dantlgraber | 474/28 |
| 4,056,015 | 11/1977 | Ludoph et al. | 474/28 |
| 4,143,558 | 3/1979 | van Deursen | 474/28 |

FOREIGN PATENT DOCUMENTS

| | | | |
|---|---|---|---|
| 2703487 | 8/1977 | Fed. Rep. of Germany . | |
| 56409 | 9/1952 | France . | |
| 1304112 | 8/1962 | France . | |
| 1325634 | 8/1973 | United Kingdom . | |
| 1343380 | 1/1974 | United Kingdom | 474/8 |

*Primary Examiner*—Leslie A. Braun
*Attorney, Agent, or Firm*—Marshall, O'Toole, Gerstein, Murray & Bicknell

[57] ABSTRACT

A continuously variable transmission incorporating a variator having first and second sheaves of adjustable effective diameter by moving one pulley half axially with respect to another to vary the effective diameter of each sheave for engagement with a flexible drive band has a fixed pulley half of one sheave facing the moveable pulley half of the other sheave to maintain alignment of the drive band in the usual way. Both adjustable pulley halves are operated from adjustment means on the same side of the drive band, one adjustment means being connected through the center of the fixed pulley half to the moveable pulley half and that fixed pulley half being mounted by its outer periphery.

3 Claims, 1 Drawing Figure

U.S. Patent   Nov. 6, 1984   4,481,004
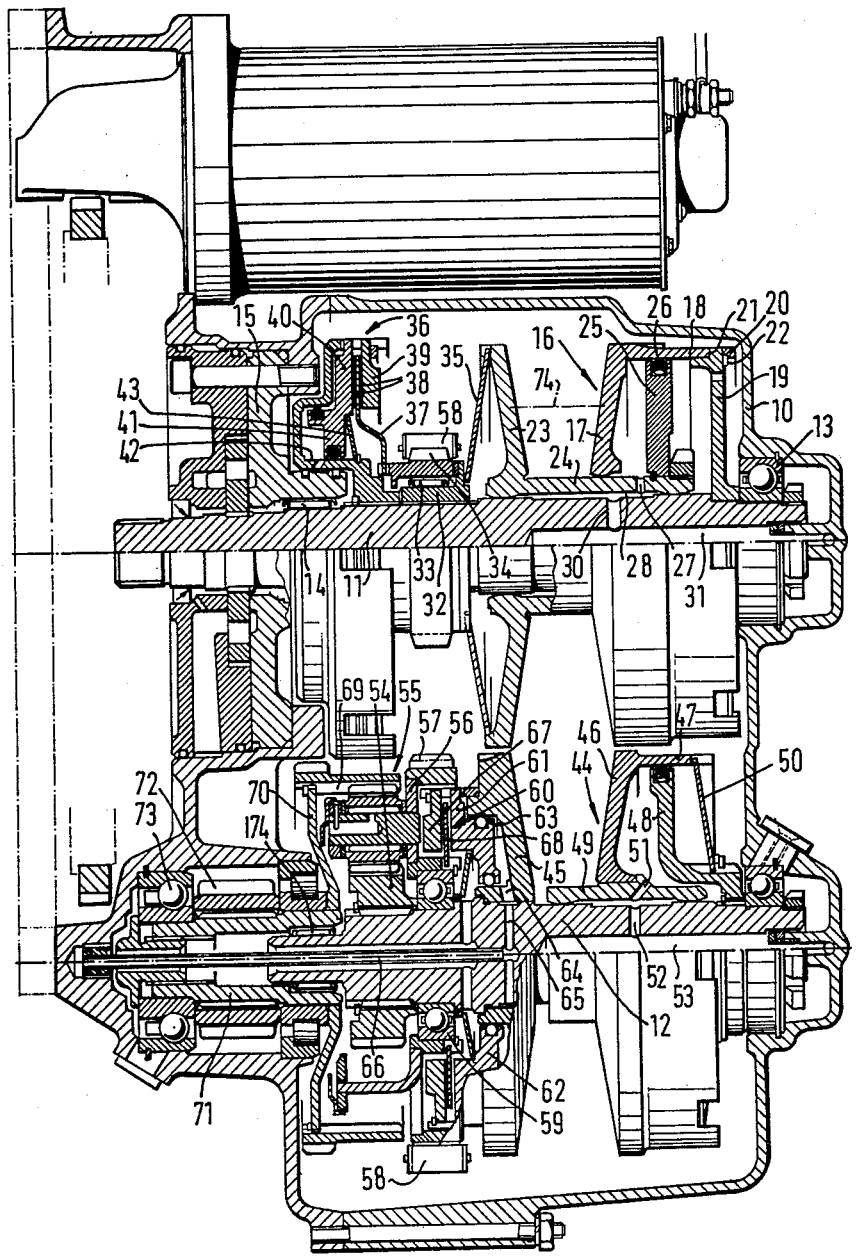

CONTINUOUSLY VARIABLE TRANSMISSION MECHANISM

This is a continuation of application Ser. No. 009,324, filed Feb. 5, 1979, now abandoned.

BACKGROUND TO THE INVENTION

1. Field of the Invention

The invention relates to a continuously variable transmission mechanism incorporating a variator having a first sheave of adjustable effective diameter on a first axis, a second sheave of adjustable effective diameter on a second axis and a flexible drive band interconnecting the two sheaves, each sheave comprising an axially fixed pulley half, an axially moveable pulley half, a V-groove for the drive band formed by inclined mutually facing surfaces of the pulley halves and adjustment means for urging the moveable pulley half towards the fixed pulley half to adjust the width of the V-groove and thus the effective diameter of the sheave for engagement with the band.

2. Description of the Prior Art

With such a variator it is normally desirable to maintain the drive band in alignment with the two sheaves in the interests of the efficiency of the variator. With the usual symmetrical V-grooves, and the usual arrangement whereby the effective diameter of one sheave is increased as the other is decreased, it is necessary for the moveable pulley half of the first sheave to lie on the same side of the band as the fixed pulley half of the other sheave so that the moveable pulley half of each sheave faces the fixed pulley half of the other sheave. Then, during adjustment, the pulley half of the sheave which is increasing in effective diameter is moved in the same axial direction as the moveable pulley half of the sheave which is reducing in effective diameter so that the band moves in the same axial direction at both sheaves and alignment is maintained.

A problem of this kind of arrangement is that it normally requires a bulky adjustment means for each sheave adjacent to each moveable pulley half and as the moveable pulley halves are on opposite sides of the band, the adjustment means also lie on opposite sides of the band. Thus the overall axial length of the variator is equivalent to the axial length of the two pulley halves plus twice the axial length of an adjustment means. The overall size of an installation is often critical and it would be desirable to be able to reduce the axial length of the variator. The positioning of the two adjustment means on opposite sides of the variator also tends to lead to difficulty in obtaining access to one of the adjustment means, both for servicing and for providing controls to the adjustment means.

One attempt at solving this problem is known from U.K. Patent Specification No. 1,325,634. According to this prior art, the normally desirable V-groove is replaced by a half V-groove in which the fixed pulley halves have radial rather than inclined faces. The drive band then remains in axial alignment with these faces so that the problem of alignment is solved. However, this proposed solution to the problem introduces several further drawbacks, namely: assymmetric loading on the band tending to distort it and cause it to wear unevenly; an absence of clearance between the outer periphery of the radial pulley half and the drive band; and difficulties associated with obtaining a wide spread of transmission ratios between the two sheaves.

SUMMARY OF THE INVENTION

An object of the present invention is to provide an improved arrangement which does not suffer from the disadvantages of the prior proposals.

According to the present invention there is provided a continuously variable transmission mechanism incorporating a variator having a first sheave of adjustable effective diameter on a first axis, a second sheave of adjustable effective diameter on a second axis, a flexible drive band interconnecting the two sheaves, each sheave comprising an axially fixed pulley half and an axially moveable pulley half, a V-groove for the drive band formed by inclined mutually facing surfaces of the pulley halves and adjustment means for urging the moveable pulley half towards the fixed pulley half to adjust the width of the V-groove and thus the effective diameter of the sheave for engagement with the band, the moveable pulley half of each sheave facing the fixed pulley half of the other sheave in order to maintain alignment of the band with the sheaves over a range of adjustment and the adjustment means for the second sheave being positioned to the side of the moveable pulley half opposite to the fixed pulley half, characterised in that the adjustment means for the first sheave is positioned to the side of the fixed pulley half opposite the moveable pulley half so that both adjustment means lie to the same side of the band.

Preferably the adjustment means for the first sheave is a fluid pressure operated piston and cylinder combination and preferably the adjustment means is connected to the moveable pulley half by means extending through the centre of the fixed pulley half, the fixed pulley half being mounted from a position radially outward of the centre thereof.

Preferably the means extending through the centre of the fixed pulley half is a sleeve carrying a piston of a piston and cylinder combination and the outer periphery of the fixed pulley half is mounted by its outer periphery to the cylinder.

BRIEF DESCRIPTION OF THE DRAWINGS

The invention will now be described in detail with reference to the accompanying drawing which is a section through a continuously variable transmission embodying the invention.

DESCRIPTION OF THE PREFERRED EMBODIMENTS

Referring now to the drawing, arranged in a casing 10 are a first shaft 11 and a second shaft 12. The shaft 11 is supported in bearings 13 and 14, the latter being arranged in a flanged collar 15 inserted into the left hand end of the casing.

A variable effective diameter sheave 16 of a variator is carried by the first shaft. The sheave comprises a first pulley half 17 which is axially fixed relative to the shaft 11 and forms the closed end of a hydraulic cylinder 18. The cylinder 18 is supported on a disc 19 which is fixed to the shaft 11, the outer periphery of the disc being dogged to the cylinder at 20 and being located between a shoulder 21 and a circlip 22. Thus pulley half 17 is fixed axially with respect to and is rotatable with shaft 11 by means of disc 19 and cylinder 18. The sheave 16 also includes a moveable pulley half 23 which is secured to the left hand end of a sleeve 24 which slides on the shaft 11 and passes through a central aperture in the sheave 17. Within the cylinder 18 the sleeve 24 carries a piston 25 which is sealed to the cylinder by a seal 26. The sleeve 24 has a passage 27 opening into the cylinder and communicating with a space 28 between the sleeve 24 and the shaft 11. The space 28 communicates via a passage 30 with a central bore 31 in the shaft. Pressure fluid can be introduced into the cylinder 18 through passages and spaces 31, 30, 28 and 27. The piston 25 in cylinder 18 thus forms an adjustment means for the moveable pulley half 23.

At the left hand end of the sheave 16 a collar 32 is splined to the shaft 11 and carries a chain sprocket 34 on roller bearings 33. A spring disc 35 extends between the collar 32 and the pulley half 23. The inner and outer edges of the disc 35 are dogged and engage corresponding dogs on the sheave 23 and collar 32 so that the pulley half 23 is driven by the spring disc from the collar 32.

The sprocket 34 can be connected to, or disconnected from, the shaft 11 by a first clutch 36. This clutch comprises a plate 37 dogged to the sprocket 34 and carrying friction linings 38. Plate 37 is interposed between a fixed abutment 39 and a pressure plate 40. The pressure plate 40 is formed with a piston part 41 which is received in a cylinder 42 to which can be supplied pressure fluid to force the pressure plate 40 towards the abutment 39 to engage the clutch. The pressure plate is urged to a disengaged position by a spring 43. When the clutch 36 is engaged the sprocket 34 is connected to the shaft 11 and when the clutch 36 is disengaged the sprocket 34 is free of the shaft 11.

Turning now to the shaft 12 this carries a second variable effective diameter sheave 44 of the variator. Sheave 44 comprises a fixed pulley half 45 and a moveable pulley half 46. The moveable pulley half 46 forms the end of a cylinder 47 in which is mounted a piston 48 fixed to the shaft 12, the cylinder 47 and the pulley half 46 being slidable on the shaft via a sleeve 49. Piston 48 and cylinder 47 form an adjustment means for the moveable pulley half 46. The cylinder 47 and pulley half 46 are driven from the shaft 12 by a spring disc 50 similar to the disc 35 and fluid pressure can be introduced into the cylinder 47 via a passage 51 in the sleeve 49 and passages 52 and 53 in the shaft 12. The pulley half 45 is secured simply and directly to the shaft 12.

To the left of the sheave 44, shaft 12 carries a sun gear 54 of an epicyclic gearset 55. The planet carrier 56 of this gearset is connected to a chain sprocket 57 which is engaged by a chain 58 which also engages the chain sprocket 34. The planet carrier is supported on the shaft 12 via a bearing 59. A second clutch 60 is interposed between the fixed pulley half 45 of sheave 44 and the planet carrier 56. This clutch comprises a pressure plate 61 having a piston part 62 slidable in a cylinder 63 formed in the fixed pulley half 45. Pressure fluid can be introduced into the cylinder 63 via a passage 64 in the pulley half and passages 65 and 66 in the shaft. The pulley half 45 carries a fixed abutment 67 for the clutch and between the pressure plate 61 and the abutment 67 is a plate 68 which is dogged to the planet carrier.

The gearset is completed by an annulus gear 69 connected via a disc 70 to an output member 71 carrying an output drive gear 72. Output member 71 is held in a bearing 73 in the casing of the transmission and there is a needle roller bearing 174 to support shaft 12 in the output member 71.

The effective diameter of the sheave 16 for its engagement with a flexible drive band 74 is varied by introducing pressure fluid into the cylinder 18 and the effective diameter of the sheave 44 is varied by introducing pressure fluid into the cylinder 47. The arrangement is such that as the effective diameter of one sheave increases that of the other sheave decreases. In practice, the pressures rather than the volumes in the two cylinders 18 and 47 are controlled and the sheaves automatically adjust their effective diameters until equilibrium is achieved.

Both of the cylinders 18 and 47 are to the same side of the drive band 74 which enables the variator as a whole to be shorter than heretofore and this is because the sheave 16, contrary to conventional practice, has the fixed pulley half 17 formed as part of the piston and cylinder arrangement which moves the moveable pulley half 23.

In one mode of operation of the transmission, the clutch 36 is engaged and the clutch 60 is disengaged. The shaft 11 is the input shaft so power passes from the shaft 11 via the drive band 74 between the sheaves 16 and 44 to the sun gear 54. Power also passes via the chain 58 from the chain sprocket 34 to the chain sprocket 57 and thus to the planet carrier 56. The annulus gear 69 is thus driven at a speed and in a direction which is a function of the parameters of the gear set and the ratios of the chain drive and the drive through the variator.

In a second mode of operation, the clutch 36 is disengaged and the clutch 60 is engaged. Clutch 60 locks up the epicyclic gearset so that power is transmitted from the shaft 11, through the variator and through the locked up gearset to the output member 71.

Further details of the operation of the transmission are described in our co-pending U.K. Patent Application No. 18628/77 dated May 4, 1977.

The fact that the operating cylinder for clutch 60 is arranged in the fixed pulley half of one of the sheaves is also a useful contribution to the overall compactness of the transmission.

The transmission is particularly useful to be incorporated into transverse engined vehicles where the output gear 72 can engage a final drive differential unit directly and where the short axial length of the transmission allows it to be placed beside the engine.

I claim:

1. In a continuously variable transmission mechanism incorporating a variator having:
    a first sheave of adjustable effective diameter on a first axis,
    a second sheave of adjustable effective diameter on a second axis,
    a flexible drive band frictionally engaging and interconnecting the two sheaves,
    each sheave comprising an axially fixed pulley half and an axially moveable pulley half,
    inclined mutually facing surfaces of the pulley halves of each sheave defining a V-groove for the sheave, and
    the moveable pulley half of each sheave facing the fixed pulley half of the other sheave in order to maintain alignment of the band with the sheaves over a range of adjustment of the distance between the pulley halves of each sheave,
    the improvement comprising:
    a first sheave adjustment means including a fluid pressure operated piston and cylinder combination positioned to the side of the fixed pulley half of the first sheave for urging the moveable pulley half towards the fixed pulley half to adjust the width of the V-groove and thus the effective diameter of the first sheave for engagement with the band, the adjustment means for the first sheave being connected to the moveable pulley half thereof by slidable means extending through a hole in the center of the fixed pulley half, and the fixed pulley half being mounted to extend radially outward from the center of the hole; and a second sheave adjustment means including a fluid pressure operated piston and cylinder combination positioned to the side of the moveable pulley half of the second sheave for urging the moveable pulley half towards the fixed pulley half to adjust the width of the V-groove and thus the effective diameter of the second sheave for engagement with the band, whereby each of the piston and cylinder combinations lie on the same side of the band.

2. The improvement according to claim 1 wherein the means extending through the center of the fixed pulley half is a sleeve carrying the piston, the outer periphery of the fixed pulley half is joined at its outer periphery to the cylinder, and the piston is moveable in the cylinder.

3. The improvement according to claim 2 in which, with respect to the piston and cylinder second sheave adjustment means, the piston is stationary and the cylinder is moveable.

* * * * *